(12) United States Patent
Terry et al.

(10) Patent No.: US 6,772,633 B2
(45) Date of Patent: Aug. 10, 2004

(54) ACOUSTICS-BASED DIAGNOSTICS

(75) Inventors: James P. Terry, Garden Valley, ID (US); William W. Uhl, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/316,711

(22) Filed: Dec. 11, 2002

(65) Prior Publication Data

US 2004/0112136 A1 Jun. 17, 2004

(51) Int. Cl.⁷ .............................................. G01N 29/00
(52) U.S. Cl. ........................ 73/587; 73/598; 73/602
(58) Field of Search .......................... 73/587, 598, 600, 73/602, 572, 579, 645; 347/19, 23, 20

(56) References Cited

U.S. PATENT DOCUMENTS

| | | | | | |
|---|---|---|---|---|---|
| 4,429,578 A | * | 2/1984 | Darrel et al. | ................. | 73/659 |
| 4,800,512 A | * | 1/1989 | Busch | ........................ | 702/182 |
| 4,956,999 A | * | 9/1990 | Bohannan et al. | ............ | 73/587 |
| 5,029,477 A | * | 7/1991 | Bambara | ..................... | 73/660 |
| 5,677,489 A | * | 10/1997 | Spillman, Jr. | ................ | 73/598 |
| 6,260,941 B1 | * | 7/2001 | Su et al. | ........................ | 347/19 |
| 6,289,735 B1 | * | 9/2001 | Dister et al. | ................... | 73/579 |
| 6,332,362 B1 | * | 12/2001 | Lee et al. | ..................... | 73/659 |
| 6,370,252 B1 | * | 4/2002 | Lunter | .......................... | 381/58 |
| 6,412,901 B2 | * | 7/2002 | Su et al. | ........................ | 347/19 |
| 6,507,790 B1 | * | 1/2003 | Radomski | ..................... | 702/39 |
| 6,581,466 B1 | * | 6/2003 | Costley et al. | ................ | 73/584 |
| 2003/0019297 A1 | * | 1/2003 | Fiebelkorn et al. | | |

* cited by examiner

Primary Examiner—Hezron Williams
Assistant Examiner—Jacques M. Saint-Surin

(57) ABSTRACT

Described herein is a technology for facilitating diagnosis of the operation of devices or machines based, at least in part, upon the acoustics of such.

38 Claims, 4 Drawing Sheets

ACOUSTICS-BASED DIAGNOSTICS

BACKGROUND

In the life of each machine with moving parts, the day comes when parts wear or fail. When that day comes, someone must fix or replace the worn or failed parts. Otherwise, the useful life of that machine is over. The cause of the fault needs to be identified for the machine to continue its serviceable life.

This is true for wide range of devices and machines with moving parts and/or consumables. For example, it is true for engines, scanners, cranes, pencil sharpeners, trucks, ships, transmissions, vending machines, printers, jukeboxes, elevators, air conditioners, fax machines, pumps, trains, photocopiers, and on and on.

Abnormal Operation

Herein, abnormal operation refers to the operation of a device or machine that is not consistent with its regular, productive, and useful functions. Particularly, these functions are those that are consistent with effective performance. With the brakes of an automobile, for example, the sound of metal grinding on metal probably indicates an abnormal operation. While the brakes are still operational and functional, their function is hampered. The noise indicates its abnormal operation.

For simplicity, this discussion will focus on the abnormal operation with office machinery. More particularly, it will focus on the printers typically found in the office or home environments, such as laser or ink-jet printers.

Troubleshooting Abnormal Printer Operation

A typical troubleshooting scenario for a printer includes a customer calling a technical support center for help. The customer describes the issue to the technician over the telephone. It is technician's goal to solve the problem; however, it is typical that she only has the information gleaned from the customer's observations and interpretations.

For example, the customer may describe the condition as a "paper jam." Frequently, the technician asks when the jam occurs during the printer operation. Typically, the technician receives answers much like this example: "it feeds a little ways and then it starts crinkling the paper." Therefore, the technician must rely on the customer's observations and interpretations of the printer operation.

Consequently, remote troubleshooting between the customer and technician may fail to find the cause of the trouble as efficiently or effectively as desired. Therefore, an on-site troubleshooting visit may be necessitated.

Since a field technician can directly observe the abnormal printer operation, an on-site visit frequently results in extremely efficient and quick solutions for the trouble. However, an on-site visit can be quite costly compared to remote troubleshooting. On-site visits include significant overhead, such as travel, labor-costs, training, and equipment.

There are significant drawbacks to this dual-tiered troubleshooting approach (of remote and then on-site). Some of those drawbacks include:

cost of on-site visits;
a cost of field and remote technicians;
cost of training field and remote technicians;
scarceness of trained field and remote technicians;

When under warranty, the manufacturer bears the burden of some or all of the time and expense of troubleshooting (including on-site visits). Even after the warranty expires, reducing the need for troubleshooting (especially on-site visits) reduces overall operating and overhead costs. It frees up resources for other tasks.

Some of the Drawbacks to Conventional Troubleshooting

With conventional troubleshooting, the remote technician typically relies on the observations and interpretations of a local untrained observer. While less expensive than on-site visits, conventional remote troubleshooting is less effective and efficient (with regard to problem solving) than having an on-site expert (e.g., a field technician).

Furthermore, conventional troubleshooting relies on trained personnel (e.g., remote and field technicians) to properly diagnose abnormal operation of machines with moving parts (e.g., printers).

SUMMARY

Described herein is a technology for facilitating diagnosis of the operation of devices or machines based, at least in part, upon the acoustics of such.

One implementation, described herein, has a sound-gathering system configured to gather sound produced by the operation of a device and it has a sound-analyzer configured to analyze the sound gathered by the sound-gathering system and determine a fault-condition of the device. Furthermore, it has a fault-signature database interface configured to interface and acquire one or more fault-signatures associated with the device from a database of such. The analysis of the gathered sound by the sound-analyzer is based upon the one or more fault-signatures acquired from the database.

BRIEF DESCRIPTION OF THE DRAWINGS

The same numbers are used throughout the drawings to reference like elements and features.

DETAILED DESCRIPTION

Figure 1:
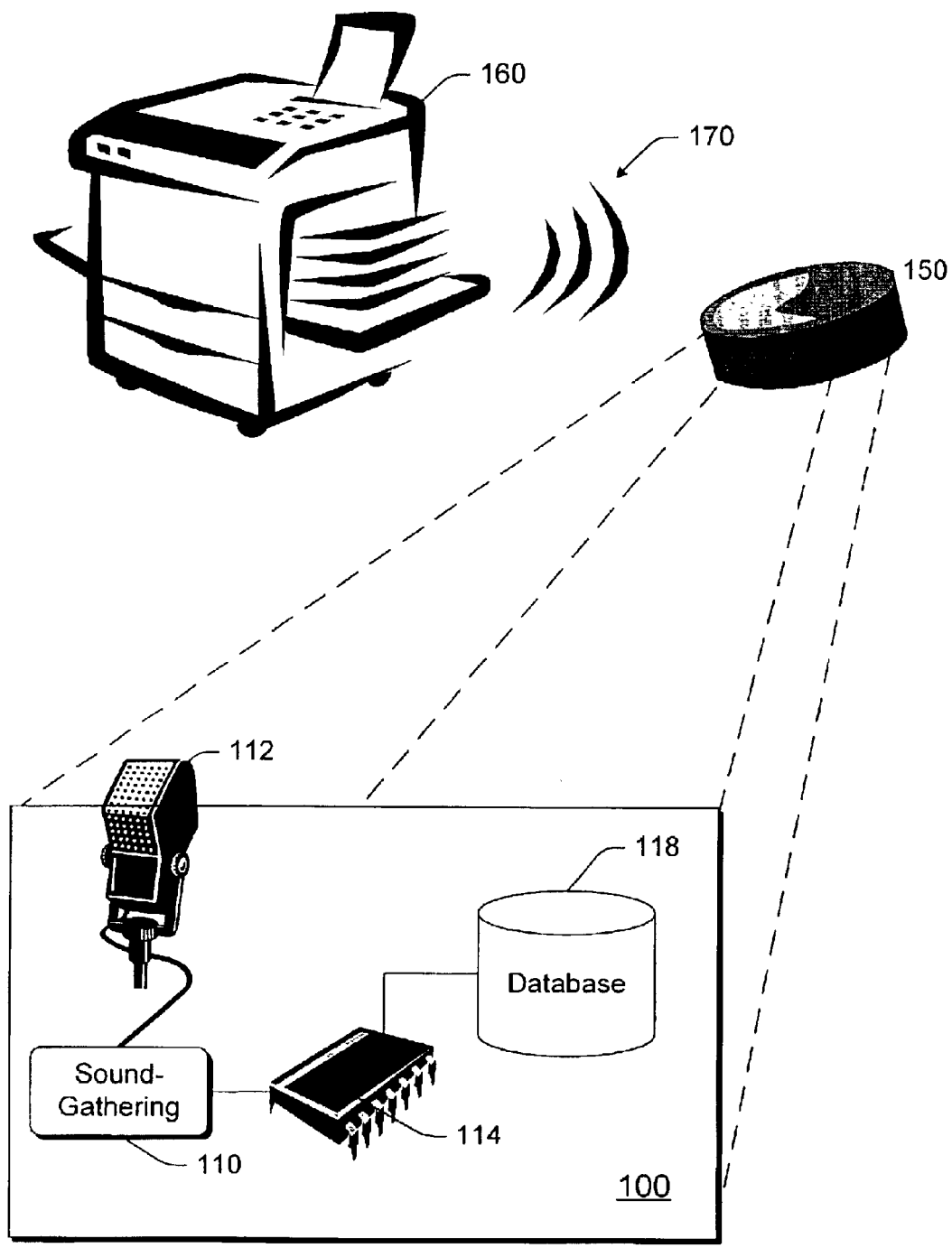
FIG. 1 illustrates an environment and an architecture that is in accordance with an implementation described herein.

The following description sets forth one or more exemplary implementations of an acoustics-based diagnostics. The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of an acoustics-based diagnostics may be referred to as an "exemplary diagnostics."

Introduction

For convenience and clarity of explanation, the bulk of the description herein focuses on office machinery and computer peripherals. Two common examples are printers and scanners. Therefore, the terms "office machinery", "computer peripheral", or "peripheral" expressly includes printers and scanners along with other devices that are not listed, but are similar in nature.

However, unless the context clearly indicates otherwise, the discussion herein applies to all devices and machines that produce sounds—especially, when such sound represents an abnormal operating condition. Common office machines fit into this classification. For example, printers, scanners, computer peripherals, photocopiers, facsimile machines, computers, etc. Therefore, the term "office machine" expressly includes these devices listed here along with others that are not listed, but are similar in nature.

By way of example only and not limitation, this is a list of other such devices and machinery that fit into this classification of those that produce sounds—especially, when such sound represents an abnormal operating condition:

audio components;

electronics;

engines.

In addition, unless the context indicates otherwise, the term "sound," as used herein, includes both audible and inaudible sounds. In other words, "sounds" includes sounds that are audible to humans, and sounds that are below the human audible range (i.e., subsonic), and sounds that are above the human audible range (i.e., ultrasonic).

Brief Overview

The one or more exemplary implementations, described herein, of the present invention may be implemented (in whole or in part) by acoustics-based diagnosis architecture 100.

With the exemplary diagnostics, mechanical issues of an abnormally operating printer may be diagnosed based upon the sound of the abnormal operation. With a database of acoustic "fault signatures" for a printer, the exemplary diagnostics automatically troubleshoots any sound emitting abnormal operation. The exemplary diagnostics analyzes the subject sound and compares it to the library of fault signatures.

Furthermore, this database may also include "fault-predictive signatures." With these, the exemplary diagnostics automatically identifies an impending fault, which would cause the printer to operate abnormally. The fault has not happened yet, but the printer is emitting a telltale sound that indicates a failure is likely to occur in the near future. Consequently, preventive maintenance may be performed more effectively and efficiently.

Exemplary Acoustics-based Diagnosis Architecture

FIG. 1 illustrates the acoustics-based diagnosis architecture 100, a diagnostic device 150, and an example of office machinery, namely a printer 160. Using the acoustics-based diagnosis architecture 100, one may automatically diagnose abnormal operation of a printer based upon the sounds of such operation. In other words, it is based upon the acoustics of the abnormal operation.

The subject of the diagnostics is the printer 160. Of course, it emits sounds when operating. Item 170 indicates to sounds that it emits when operating abnormally.

Diagnostic device 150 is illustrated as a separate device in a circular, hockey-puck-like casing. It houses the components of the acoustics-based diagnosis architecture 100. This is an example of one implementation. However, the diagnostic device 150 may be most any other sized and shaped casing.

Furthermore, the diagnostic device 150 need not be separate from the printer 160. One or more of its components may be integrated into the printer itself. Moreover, the communicatively linked components of the acoustics-based diagnosis architecture 100 may be separately housed in different devices.

The acoustics-based diagnosis architecture 100 includes sound-gathering system 110 for gathering and amplifying sound 170. Sound-gathering system 110 typically includes a microphone 112 and an amplifier (not shown separately). The architecture 100 may also include an analog-to-digital (A/D) converter (not shown separately) to convert the sound into a digital representation.

The microphone 112 of the sound-gathering system 110 may be a microphone connected to a laptop computer of a field technician. It may be located inside the printer itself.

The microphone may be mounted on or inside the front panel of the printer and generates a signal, which is sent to a main processor. The signal may be amplified, digitized or otherwise processed before it is inputted to the main processor. The input signal is representative of noise coming from the printer internally. Having the microphone strategically placed (e.g., near the gear mechanism) may make it easier to acquire the signal needed to diagnose problems.

Although the microphone 112 of the sound-gathering system 110 will be located within hearing distance of the subject printer 160, nearly all of the other components of the acoustics-based diagnosis architecture 100 may be located remotely from the printer.

FIG. 1 shows the acoustics-based diagnosis architecture 100 further includes a sound-analyzer 114 and fault-signature database 118.

The sound-analyzer 114 analyzes the sampled sound from the printer's abnormal operation. Typically, the sound-analyzer will include a computer and one or more program modules. It may also be a dedicated hardware device. As part of that analysis, it may access the database 118 of "fault signatures" or "fault fingerprints."

Within the acoustics-based diagnosis architecture 100, the sound-analyzer 114 processes the input signal from the sound gathering system 110 as by using zero-crossing time-sliced FFT (Fast Fourier Transform) at predetermined intervals to analyze printer noise. For example, it might use 100 msec time slices. The fingerprint of a noise pattern from database 118 is sent to analyzer 114 which may be, for example, a printer driver software module (running on a connected personal computer). Alternatively, it maybe analyzed by a hardwired circuitry on the printer itself.

In one implementation, the sound-analyzer 114 is part of a processor board of the printer 160 and the "fault signatures" are stored on a database 118, which is a network-connected server, such as a web server.

If the acoustics-based diagnosis architecture 100 is near or part of the printer, it can very effectively "listen" to the printer's operation and determine whether there are any abnormal sounds that could signal an existing or an impending problem.

In another implementation, the sound-analyzer 114 and the memory 116 are part of a separate computer that is communicatively connected to the printer 160. The computer may be running a special program module and/or printer driver. In this implementation, the database of "fault signatures" is stored on the computer or on a network-connected server, such as a web server.

All of the components of the acoustics-based diagnosis architecture 100 may be connected via local or remote communications links (wired or wireless). Therefore, they need not be collected together within a singular device.

In addition, these components do not need to be dedicated to this functionality. The components may be shared with other devices and functionalities. For example, the sound-analyzer may be same central processor used by the printer itself; a CPU of a general-purpose personal computer; a processor of a web server, etc.

The database 118 may be, for example, contained in a device, such as the device 150, and that device may contain other components of the acoustics-based diagnosis architecture 100 as well. The database 118 may also be stored on a computer storage medium (like the hard drive of a laptop); stored on a remotely linked web server; etc.

Predictive Preventive Maintenance

In addition to diagnosing present abnormal operating conditions of the printer, the exemplary diagnostics may predict the onset of an abnormal condition in the near future. While the printer appears to be operating normally, it may emit telltale sounds that indicate a need for maintenance or repair in the near future. For example, a small squeak from a gear may indicate that it will need replacement within two-three months.

With the exemplary diagnostics, preventive maintenance may be effectively performed from the failure prediction based upon the sounds the printer is emitting. This will help reduce downtime by allowing user to schedule maintenance on issues before they occur.

Database

Each problem condition ("fault") will typically have a unique audio signature ("fault signature"). Each predictive problem condition will also typically have its own unique audio signature ("predictive fault signature"). These fault signatures can be determined empirically and with a dose of heuristics. In other words, a series of numerous experiments (or field tests) are performed on each subject device to record the sounds of various fault and predictive-fault conditions. The automatic troubleshooting using these fault signatures may be refined based upon the experience and knowledge of expert technicians Such fault signatures may be categorized and associated in a relational database. Diagnostic algorithms compare noise signals to one or more fault signatures to draw conclusions regarding the existence of one or more current or future problem condition(s).

Time Delayed Analysis of Abnormal Operational Sounds

In another implementation of the exemplary diagnostics, the sounds of the printer may be recorded. That recording may be stored. It may be transmitted or delivered to a sound processing center.

With this implementation, the operational sounds of the printer are manually or automatically recorded (e.g., MP3 format). This sound file may be processed by a computer linked to the printer. Alternatively, this sound file may be transmitted (e.g., via email) to a remote sound processing center.

Methodological Implementation of the Exemplary Diagnostics

Figure 2:
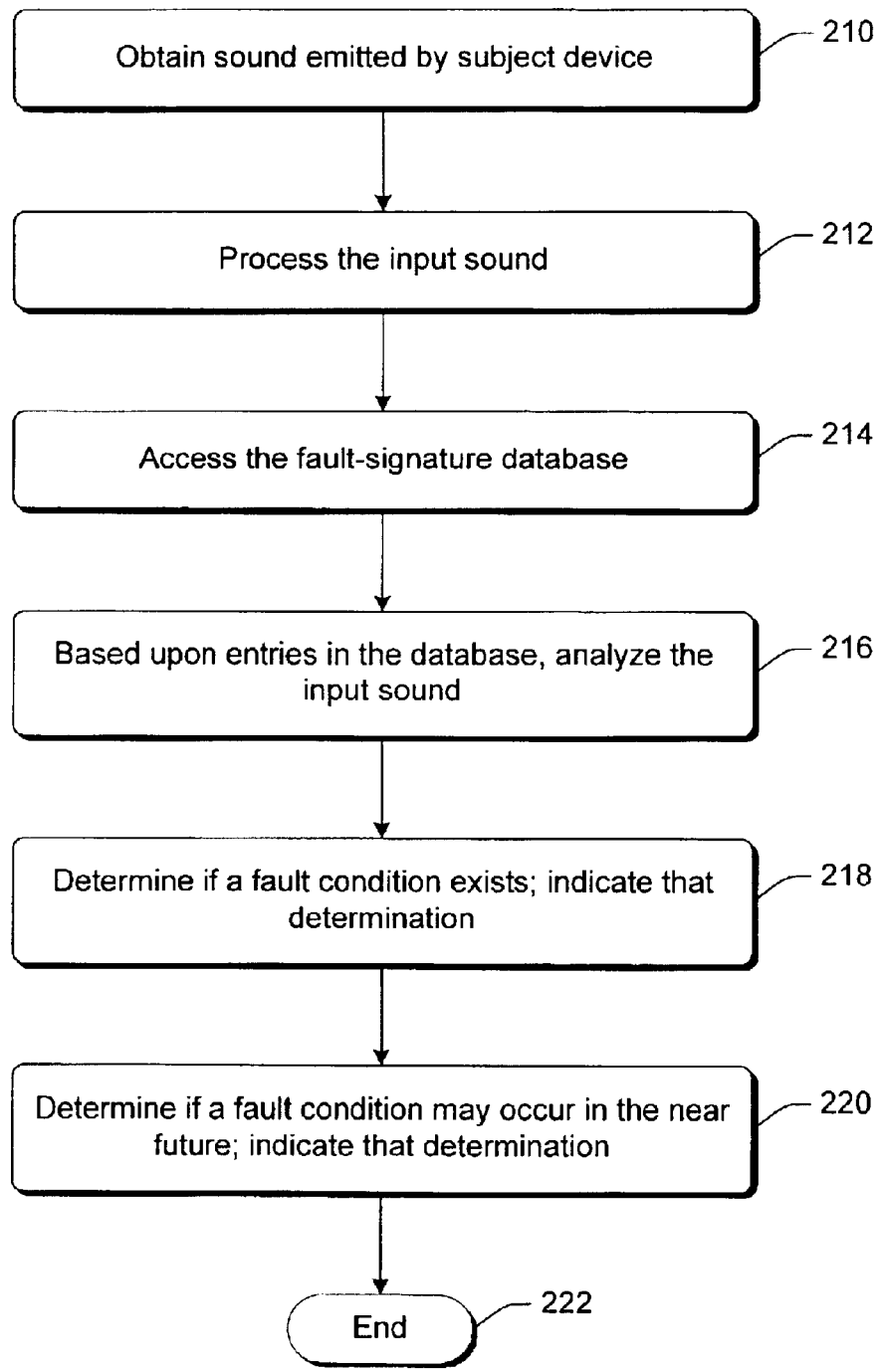
FIG. 2 is a flow diagram showing a methodological implementation described herein.

FIG. 2 shows a methodological implementation of the exemplary diagnostics performed by the acoustics-based diagnosis architecture 100 (or some portion thereof). This methodological implementation may be performed in software, hardware, or a combination thereof.

At 210 of FIG. 2, the exemplary diagnostics obtains sound emitted by a subject device. Herein, the primary example of a subject device is a printer, but it may be any devices or machine that produces sounds—especially, when such sound represents an abnormal operating condition. The sound-gathering system 110 is the primary example of component that the acoustics-based diagnosis architecture 100 may employ to accomplish this.

At 212, the input sound is processed. It may be processed immediately upon receiving it or at a later time (if the sound had been recorded). The sound-analyzer 114 is the primary example of a component that the acoustics-based diagnosis architecture 100 may employ to accomplish this.

Other examples are A/D converters, amplifiers, filters, etc, which may be used in combination with a primary processor. This processing step places the sound signal in a form suitable for analysis.

At 214, the exemplary diagnostics accesses data in a fault-signature database. This database may include fault-signatures of both current faults and predictive faults. The database 118 is the primary example of component that the acoustics-based diagnosis architecture 100 may employed to store the signatures.

At 216, the exemplary diagnostics analyzes the input sound comparing it to one or more fault signatures acquired from the database. Based upon such analysis, it determines whether a current fault condition exists and what that condition is. At 218, it indicates the result of that determination.

The exemplary diagnostics may optionally determine whether a future fault condition exists and what that condition is. At 220, it indicates the result of that determination.

The process ends at 222.

Exemplary Printer Architecture

Figure 3:
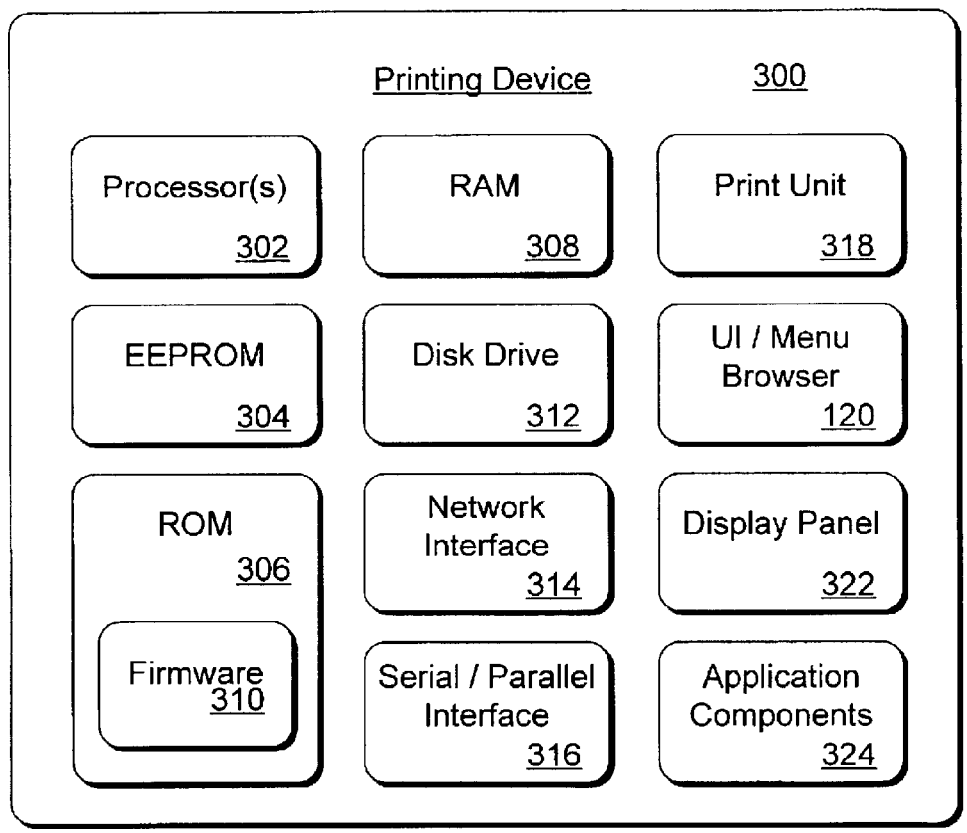
FIG. 3 is an example of a printer architecture capable of implementing an implementation (wholly or partially) described herein.

FIG. 3 illustrates various components of an exemplary printing device 300 that can be utilized the exemplary diagnostics.

Printer 300 includes one or more processors 302, an electrically erasable programmable read-only memory (EEPROM) 304, ROM 306 (non-erasable), and a random access memory (RAM) 308. Although printer 300 is illustrated having an EEPROM 304 and ROM 306, a particular printer may only include one of the memory components. Additionally, although not shown, a system bus typically connects the various components within the printing device 300.

The printer 300 also has a firmware component 310 that is implemented as a permanent memory module stored on ROM 306. The firmware 310 is programmed and tested like software, and is distributed with the printer 300. The firmware 310 can be implemented to coordinate operations of the hardware within printer 300 and contains programming constructs used to perform such operations.

Processor(s) 302 process various instructions to control the operation of the printer 300 and to communicate with other electronic and computing devices. The memory components, EEPROM 304, ROM 306, and RAM 308, store various information and/or data such as configuration information, fonts, templates, data being printed, and menu structure information. Although not shown, a particular printer can also include a flash memory device in place of or in addition to EEPROM 304 and ROM 306.

Printer 300 also includes a disk drive 312, a network interface 314, and a serial/parallel interface 316. Disk drive 312 provides additional storage for data being printed or other information maintained by the printer 300. Although printer 300 is illustrated having both RAM 308 and a disk drive 312, a particular printer may include either RAM 308 or disk drive 312, depending on the storage needs of the printer. For example, an inexpensive printer may include a small amount of RAM 308 and no disk drive 312, thereby reducing the manufacturing cost of the printer.

Network interface 314 provides a connection between printer 300 and a data communication network. The network interface 314 allows devices coupled to a common data communication network to send print jobs, menu data, and other information to printer 300 via the network. Similarly, serial/parallel interface 316 provides a data communication path directly between printer 300 and another electronic or computing device. Although printer 300 is illustrated having a network interface 314 and serial/parallel interface 316, a particular printer may only include one interface component.

Printer 300 also includes a print unit 318 that includes mechanisms arranged to selectively apply ink (e.g., liquid ink, toner, etc.) to a print media such as paper, plastic, fabric, and the like in accordance with print data corresponding to a print job. For example, print unit 318 can include a conventional laser printing mechanism that selectively causes toner to be applied to an intermediate surface of a drum or belt. The intermediate surface can then be brought within close proximity of a print media in a manner that causes the toner to be transferred to the print media in a controlled fashion. The toner on the print media can then be more permanently fixed to the print media, for example, by selectively applying thermal energy to the toner.

Print unit 318 can also be configured to support duplex printing, for example, by selectively flipping or turning the print media as required to print on both sides. Those skilled in the art will recognize that there are many different types of print units available, and that for the purposes of the present invention, print unit 318 can include any of these different types.

Printer 300 also includes a user interface and menu browser 320, and a display panel 322. The user interface and menu browser 320 allows a user of the printer 300 to navigate the printer's menu structure. User interface 320 can be indicators or a series of buttons, switches, or other selectable controls that are manipulated by a user of the printer. Display panel 322 is a graphical display that provides information regarding the status of the printer 300 and the current options available to a user through the menu structure.

Printer 300 can, and typically does, include application components 324 that provide a runtime environment in which software applications or applets can run or execute. One exemplary runtime environment is a Java Virtual Machine (JVM). Those skilled in the art will recognize that there are many different types of runtime environments available. A runtime environment facilitates the extensibility of printer 300 by allowing various interfaces to be defined that, in turn, allow the application components 324 to interact with the printer.

Exemplary Computer Architecture

Figure 4:
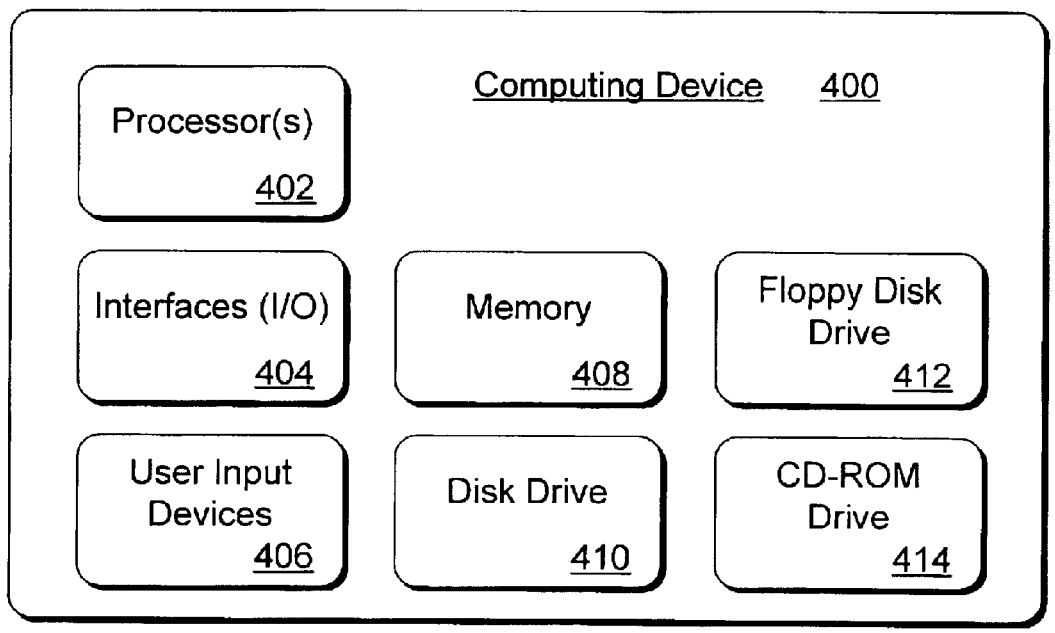
FIG. 4 is an example of a computing operating environment capable of implementing an implementation (wholly or partially) described herein.

FIG. 4 illustrates various components of an exemplary computing device 400 that can be utilized to implement the exemplary diagnostics.

Computer 400 includes one or more processors 402, interfaces 404 for inputting and outputting data, and user input devices 406. Processor(s) 402 process various instructions to control the operation of computer 400, while interfaces 404 provide a mechanism for computer 400 to communicate with other electronic and computing devices. User input devices 406 include a keyboard, mouse, pointing device, or other mechanisms for interacting with, and inputting information to computer 400.

Computer 400 also includes a memory 408 (such as ROM and/or RAM), a disk drive 410, a floppy disk drive 412, and a CD-ROM drive 414. Memory 408, disk drive 410, floppy disk drive 412, and CD-ROM drive 414 provide data storage mechanisms for computer 400. Although not shown, a system bus typically connects the various components within the computing device 400.

What is claimed is:

1. A method for acoustics-based diagnosis, the method comprising:

obtaining a sound emitted by a device, wherein the device emits such sound while the device operates;

processing the sound;

acquiring one or more acoustics-based fault-signatures associated with the device, the fault-signatures being stored in a database of such signatures and the fault-signatures representing sounds emitted by the device while the device is in a fault condition;

analyzing the processed sound based upon the one or more acquired fault-signatures;

based upon such analysis, determining whether the device has a fault condition evidenced by the sound that it emitted;

indicating the result of such determination.

2. A method as recited in claim 1, wherein the fault condition is a present fault condition.

3. A method as recited in claim 1, wherein the fault condition is a future fault condition.

4. A method as recited in claim 1, wherein the device is office machinery.

5. A method as recited in claim 1, wherein the device is selected from a group consisting of:

computer peripheral;

printer;

scanner;

fax machine;

electronics.

6. A computer-readable medium having computer-executable instructions that, when executed by a computer, performs a method for acoustics-based diagnosis, the method comprising:

obtaining a sound emitted by a device, wherein the device emits such sound while the device operates;

processing the sound;

acquiring one or more acoustics-based fault-signatures associated with the device, the fault-signatures being stored in a database of such signatures and the fault-signatures representing sounds emitted by the device while the device is in a fault condition;

analyzing the processed sound based upon the one or more acquired fault-signatures;

based upon such analysis, determining whether the device has a fault condition evidenced by the sound that it emitted;

indicating the result of such determination.

7. A medium as recited in claim 6, wherein the fault condition is a present fault condition.

8. A medium as recited in claim 6, wherein the fault condition is a future fault condition.

9. A medium as recited in claim 6, wherein the sounds produced by the device are indicative of one or more present abnormal operating conditions.

10. A medium as recited in claim 6, wherein the sounds produced by the device are indicative of one or more future abnormal operating conditions.

11. A medium as recited in claim 6, wherein the device is selected from a group consisting of:

office machinery;
copier;
computer peripheral;
printer;
scanner;
fax machine;
electronics.

12. A method for acoustics-based diagnosis, the method comprising:

processing the sound emitted by a device, wherein the device emits such sound while the device operates;

acquiring one or more acoustics-based fault-signatures associated with the device, the fault-signatures being stored in a database of such signatures and the fault-signatures representing sounds emitted by the device while the device is in a fault condition;

analyzing the processed sound based upon the one or more fault-signatures associated with the device;

based upon such analysis, determining whether the device has a fault condition evidenced by the sound that it emitted.

13. A method as recited in claim 12 further comprising acquiring one or more acoustics-based fault-signatures associated with the device.

14. A method as recited in claim 12 further comprising indicating the result of such determination.

15. A method as recited in claim 12, wherein the fault condition is a present fault condition.

16. A method as recited in claim 12, wherein the fault condition is a future fault condition.

17. A method as recited in claim 12, wherein the device produces sounds when operating under normal conditions.

18. A method as recited in claim 12, wherein the device produces sounds when operating abnormally.

19. A method as recited in claim 12, wherein the sounds produced by the device are indicative of one or more present abnormal operating conditions.

20. A method as recited in claim 12, wherein the sounds produced by the device are indicative of one or more future abnormal operating conditions.

21. A method as recited in claim 12, wherein the device is office machinery.

22. A computer-readable medium having computer-executable instructions that, when executed by a computer, performs a method for acoustics-based diagnosis, the method comprising:

processing the sound emitted by a device, wherein the device emits such sound while the device operates;

acquiring one or more acoustics-based fault-signatures associated with the device, the fault-signatures being stored in a database of such signatures and the fault-signatures representing sound emitted by the device while the device is in a fault condition;

analyzing the processed sound based upon the one or more fault-signatures associated with the device;

based upon such analysis, determining whether the device has a fault condition evidenced by the sound that it emitted.

23. A medium as recited in claim 22, wherein the method further comprises acquiring one or more acoustics-based fault-signatures associated with the device.

24. A medium as recited in claim 22, wherein the method further comprises indicating the result of such determination.

25. A medium as recited in claim 22, wherein the fault condition is a present fault condition.

26. A medium as recited in claim 22, wherein the fault condition is a future fault condition.

27. An acoustics-based diagnostics architecture comprising:

a sound-gathering system configured to gather sound produced by the operation of a device;

a sound-analyzer configured to analyze the sound gathered by the sound-gathering system and determine a fault-condition of the device;

a fault-signature database interface configured to interface and acquire one or more fault-signatures associated with the device from a database of such;

wherein the analysis of the gathered sound by the sound-analyzer is based upon the one or more fault-signatures acquired from the database.

28. An architecture as recited in claim 27, further comprising a fault-indicator configured to produce an indication that specifies whether the device has a fault condition evidenced by the sound that it produces.

29. An architecture as recited in claim 27, wherein the fault condition is a present fault condition.

30. An architecture as recited in claim 27, wherein the fault condition is a future fault condition.

31. A system for acoustics-based diagnostics, the system comprising:

a memory comprising a set of computer program instructions; and a processor coupled to the memory, the processor being configured to execute the computer program instructions, which comprise:

processing the sound emitted by a device, wherein the device emits such sound while the device operates;

acquiring one or more acoustics-based fault-signatures associated with the device, the fault-signatures being stored in a database of such signatures and the fault-signatures representing sounds emitted by the device while the device is in a fault condition;

analyzing the processed sound based upon one or more fault-signatures associated with the device;

based upon such analysis, determining whether the device has a fault condition evidenced by the sound that it emitted.

32. A system as recited in claim 31, wherein the instructions further comprise acquiring one or more acoustics-based fault-signatures associated with the device.

33. A system as recited in claim 31, wherein the instructions further comprise indicating the result of such determination.

34. A system as recited in claim 31, wherein the fault condition is a present fault condition.

35. A system as recited in claim 31, wherein the fault condition is a future fault condition.

36. A system as recited in claim 31, wherein the system is a printer.

37. A printer comprising:

a microphone;

a memory storing a set of computer program instructions comprising acoustic fault signatures, the fault-signatures representing sounds emitted by the device while the device is in a fault condition;

a processor coupled to the memory, the processor being configured to execute the computer program instructions and further configured to receive a printer noise signal generated by the microphone and an acoustic fault signature signal from the memory.

38. A printer as recited in claim 37, wherein the processor is configured to compare the printer noise signal to said acoustic fault signature signal and generate a signal indicative of the comparison.

* * * * *